United States Patent [19]
Syler et al.

[11] Patent Number: 5,746,344
[45] Date of Patent: May 5, 1998

[54] TANK CONNECTOR CONSTRUCTION

[75] Inventors: Rodney R. Syler, Franklin; Rolf E. Faber, Clarksville; D. Kent Lindahl, Pleasant View, all of Tenn.

[73] Assignee: State Industries, Inc., Ashland City, Tenn.

[21] Appl. No.: 643,290

[22] Filed: May 8, 1996

Related U.S. Application Data

[63] Continuation of Ser. No. 273,579, Jul. 11, 1994, abandoned.

[51] Int. Cl.$^6$ ............................................. B65D 25/16
[52] U.S. Cl. ..................... 220/465; 220/582; 220/601; 220/626; 220/661
[58] Field of Search ........................... 220/465, 582, 220/288, 601, 626, 661

[56] References Cited

U.S. PATENT DOCUMENTS

| | | | |
|---|---|---|---|
| 4,775,073 | 10/1988 | Webb | 220/256 |
| 5,158,200 | 10/1992 | Vago et al. | 220/465 |
| 5,217,138 | 6/1993 | Nichols | 220/403 |
| 5,222,620 | 6/1993 | Lima et al. | 220/404 |

Primary Examiner—Stephen Cronin
Attorney, Agent, or Firm—Paul R. Puerner

[57] ABSTRACT

A tank connector assembly including a metal spud member having an internally threaded portion and a cylindrical wall portion. An insert member of polymer material having a cylindrical wall portion. The insert member is mounted inside the cylindrical wall portion of the spud member. A bonding member of polymer material fits the cylindrical wall portion of said bonding member positioned between the external surface of the cylindrical wall portion of the insert member and the internal surface of the cylindrical wall portion of the spud member. The cylindrical wall portion of said bonding member being securely bonded to both the insert member and the spud member. In a preferred embodiment, the polymer material of the bonding member is malcated olefin. The bonding of the cylindrical wall portion of the bonding member to the polymer insert and the steel spud will prevent or at least substantially reduce any tendency of the water in the tank to leak past the outer surface of the insert member which, in turn, prevents water from coming into contact with the wall of the steel tank. Such contact if allowed to occur may cause corrosion of the steel tank. The bond between the outer surface of the cylindrical wall of the bonding member and the steel spud prevents water from coming into contact with the steel spud to thus prevent corrosion of the spud.

2 Claims, 6 Drawing Sheets

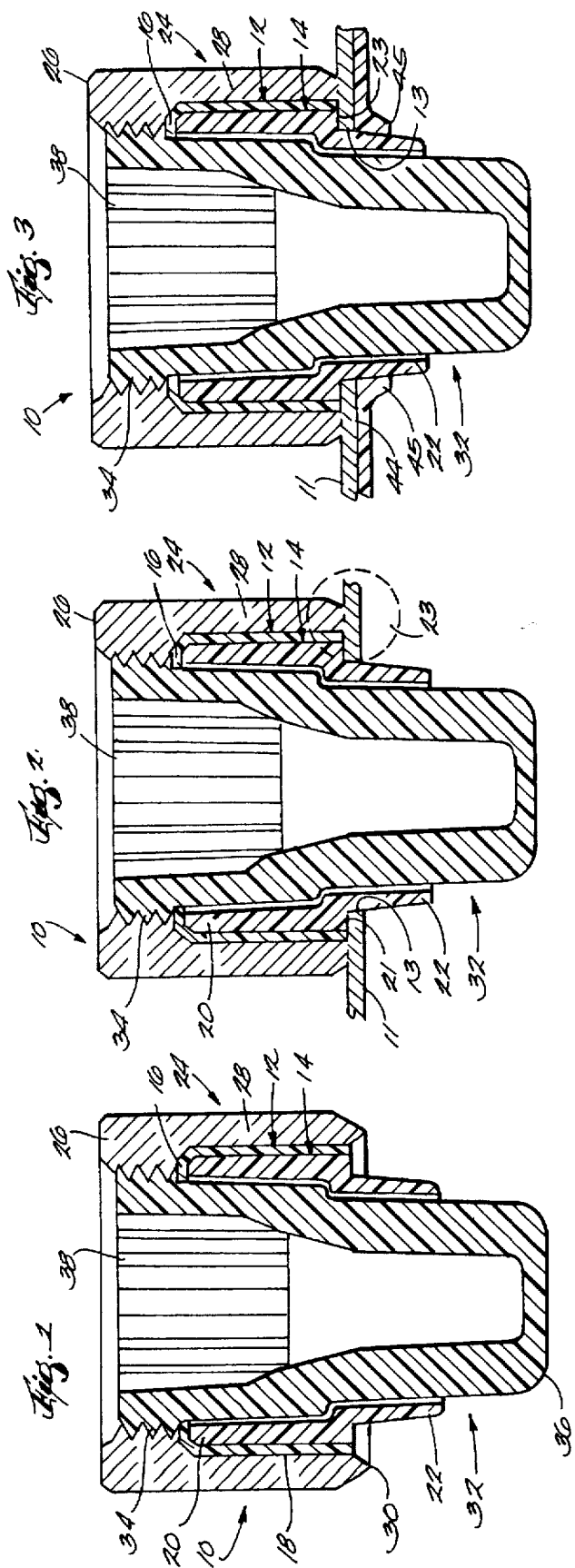

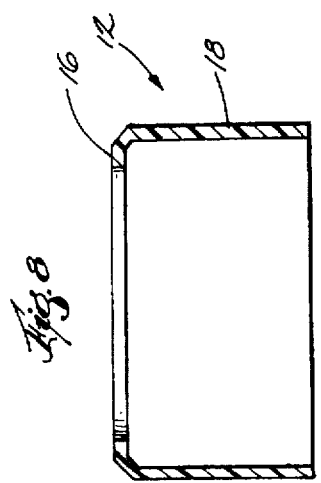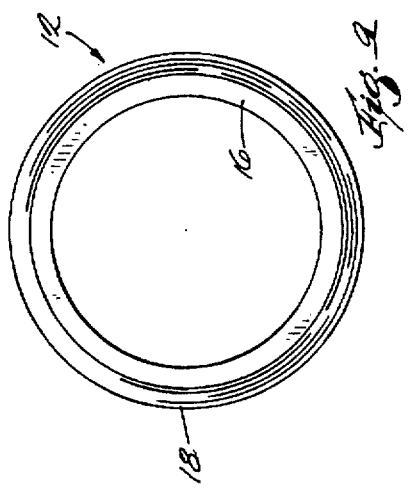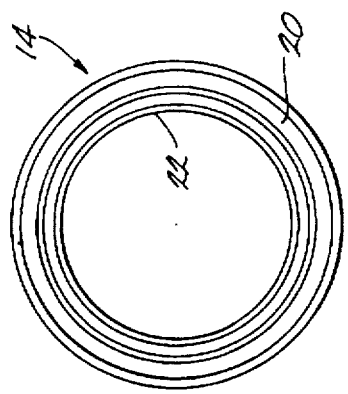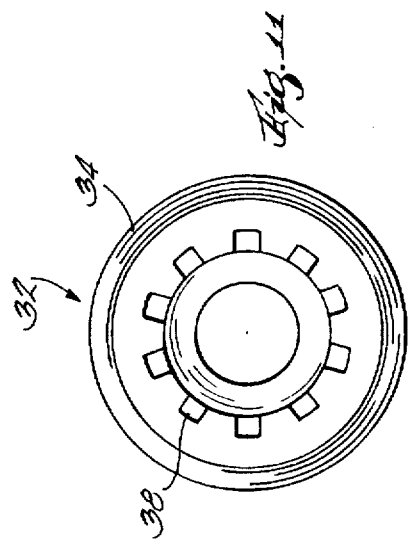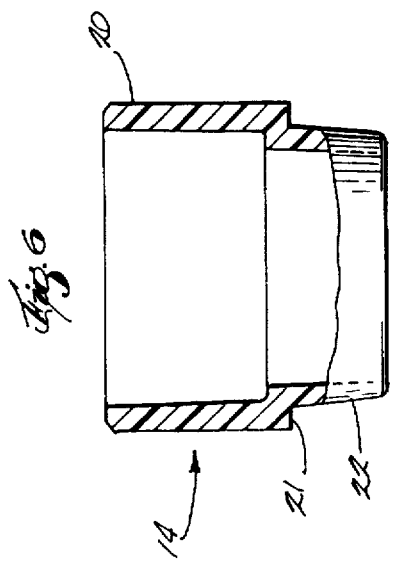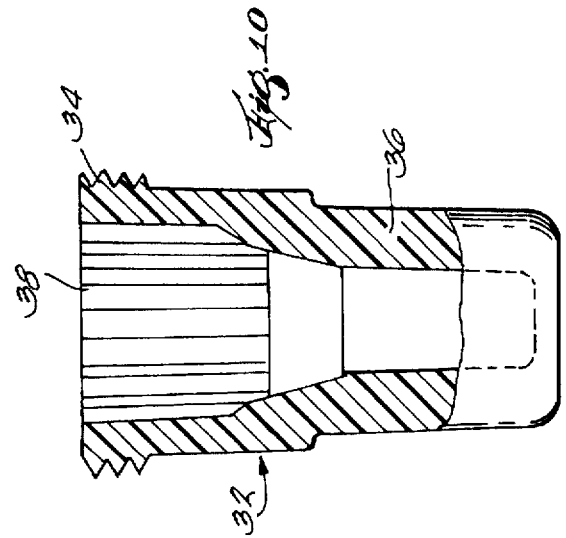

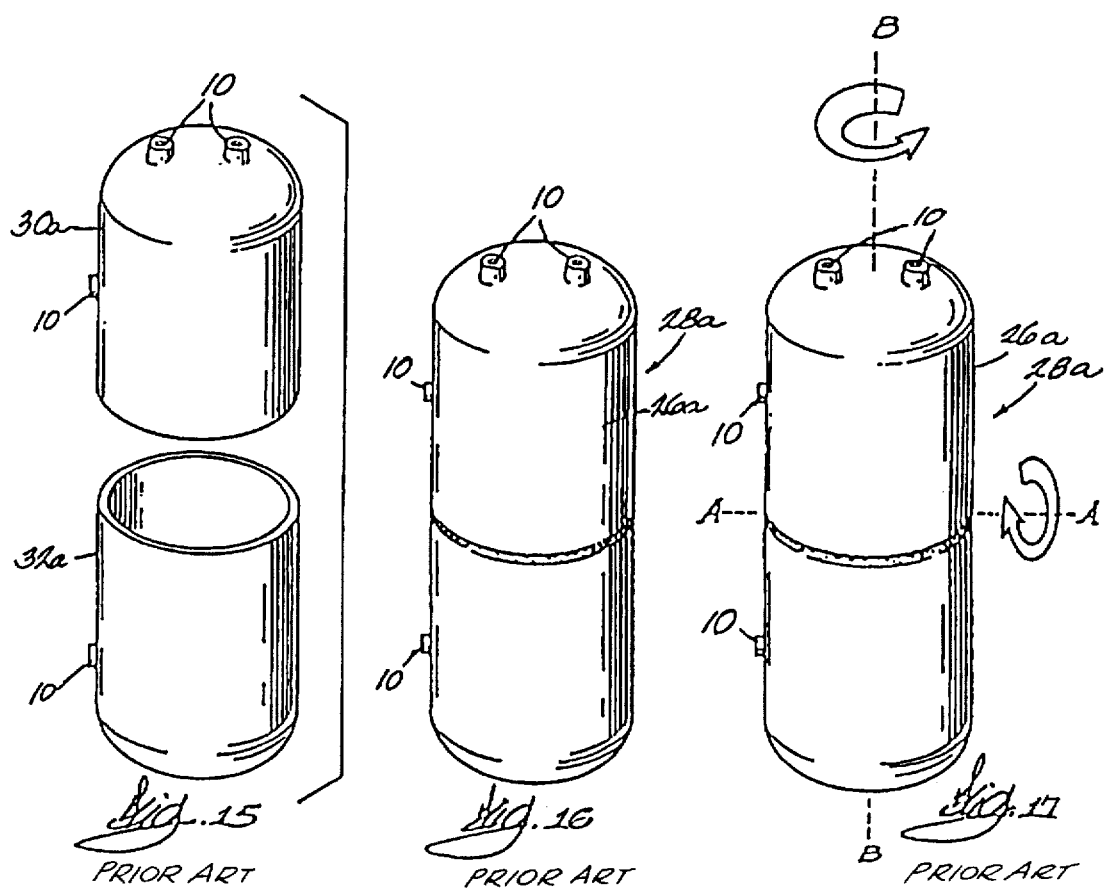

TANK CONNECTOR CONSTRUCTION

This is a continuation of application Ser. No. 08/273,579 filed on Jul. 11, 1994, now abandoned.

BACKGROUND OF THE INVENTION

The background of the invention is set forth hereafter under the heading "Description of the Prior Art".

SUMMARY OF THE INVENTION

A tank connector assembly including a metal spud member having an internally threaded portion and a cylindrical wall portion. An insert member of polymer material having a cylindrical wall portion is mounted inside the cylindrical wall portion of the spud member. A bonding member of polymer material is positioned between the external surface of the cylindrical wall portion of the insert member and the internal surface of the cylindrical wall portion of the spud member. The bonding member is bonded to both the insert member and the spud member. In a preferred embodiment, the polymer material of the bonding member is maleated olefin.

BRIEF DESCRIPTION OF THE DRAWINGS

FIG. 1 is a sectional view of a connector assembly made in accordance with the present invention with the assembly positioned in an opening in a tank wall;

FIG. 2 is a section view of the connector assembly of FIG. 1 after the assembly has been welded in the opening in the tank wall;

FIG. 3 is a sectional view of the connector assembly of FIG. 2 after an inner shell of polymer material has been formed inside the outer tank wall;

FIG. 4 is a sectional view of the spud member used in the connector assembly;

FIG. 5 is a top plan view of the spud member shown in FIG. 4;

FIG. 6 is a side elevation view of the insert member used in the connector assembly;

FIG. 7 is a top plan view of the insert member shown in FIG. 6;

FIG. 8 is a sectional view of the bonding member used in the connector assembly;

FIG. 9 is a bottom plan view of the bonding member shown in FIG. 8;

FIG. 10 is a sectional view of the core member used in the connector assembly;

FIG. 12 is a sectional view of a second embodiment of a connector assembly made in accordance with the present invention.

FIGS. 15, 16, 17, 18 and 19 correspond to FIGS. 2, 3, 4, 5, and 6 in U.S. Pat. No. 5,217,140.

DESCRIPTION OF THE PREFERRED EMBODIMENT

Figure 3A:
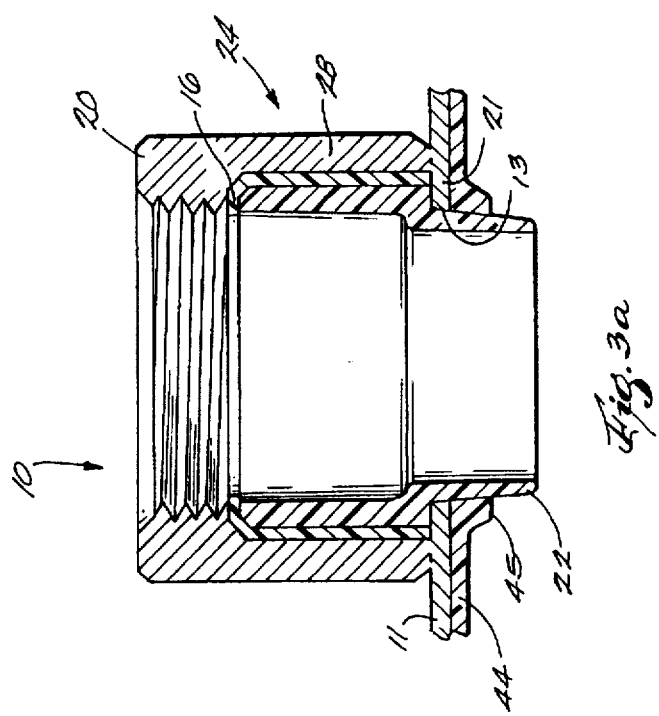
FIG. 3a is a sectional view of the connector assembly of FIG. 3 after the plug member has been removed from the spud.

The tank connector fitting construction of the present invention is specifically designed for use in a tank comprised of an outer shell of metal material and an inner shell of non-corrosive and non-metallic polymer material. More specifically, the preferred embodiment of the present invention is designed for installation in a tank construction shown and described in U.S. Pat. No. 5,217,140 issued Jun. 8, 1993 and assigned to the assignee of this application and incorporated herein by reference.

DESCRIPTION OF THE PREFERRED EMBODIMENT

Prior tank connector fittings for use in the tank construction shown in U.S. Pat. No. 5,217,140 are shown and described in U.S. Pat. No. 5,158,200 dated Oct. 27, 1992 and assigned to the assignee of this application. An example of such a prior art tank connector construction is as follows.

Referring to FIGS. 13A–13D, FIG. 131 shows a tank connection comprised of an outer tank shell 370 of metal and a metal connector fitting 372 welded to shell 370 at weld areas 374. Fitting 372 has an internal threaded body portion 376 and an internal groove 378. A sleeve 380 having a cylindrical body portion 382 and a radially extending flange portion 384 is mounted in groove 378 of fitting 372. Body portion 382 and flange 384 have a continuous smooth tapered internal surface 385. Sleeve 380 is made of a polymer material. The body portion 382 of sleeve 380 extends through an opening 386 in shell 370.

Figure 13A:
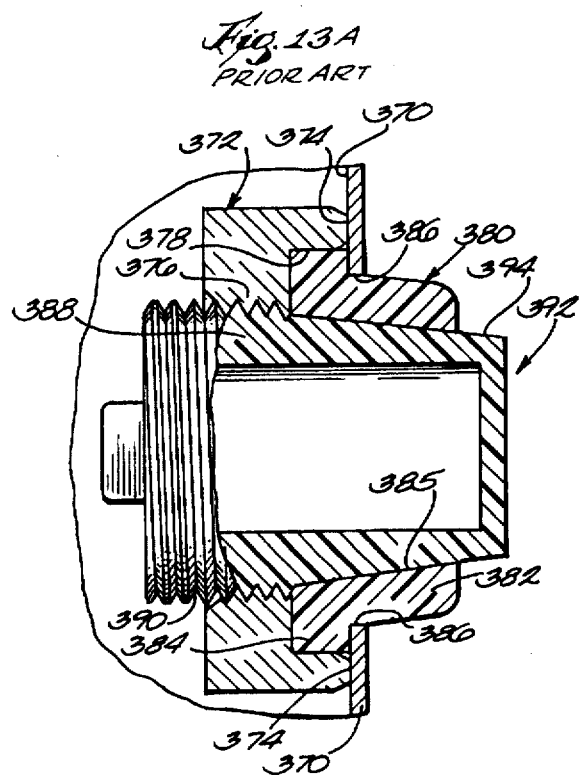
FIGS. 13A–13D show a prior art tank connector reproduced from U.S. Pat. No. 5,158,200.

A plug member 388 is threaded into fitting 372 and extends through sleeve 380 as shown in FIG. 13A. Plug member 388 is preferably made of a material having a low thermal conductivity such as fluoroplastics. Plug member 388 is comprised of an externally threaded body portion 390 and an end portion 392 having a smooth external tapered surface 394. With the plug 388 installed as shown in FIG. 13A, the threaded portion 390 extends only to the groove 378 in fitting 372 and the tapered surface 394 on the plug fits snugly in the tapered internal surface 385 of sleeve 380.

Figure 13B:
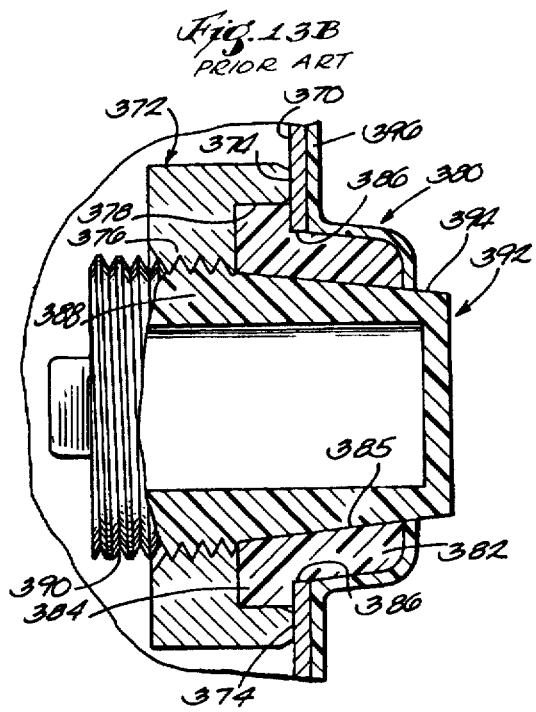

FIG. 13B shows the assembly of FIG. 13A after an inner shell 396 has been formed in the metal outer shell 370. Inner shell 396 is preferably made of a polymer material and is formed by a rotational casting procedure. The inner shell 396 will become fused to the exposed surface of sleeve 380.

Figure 13C:
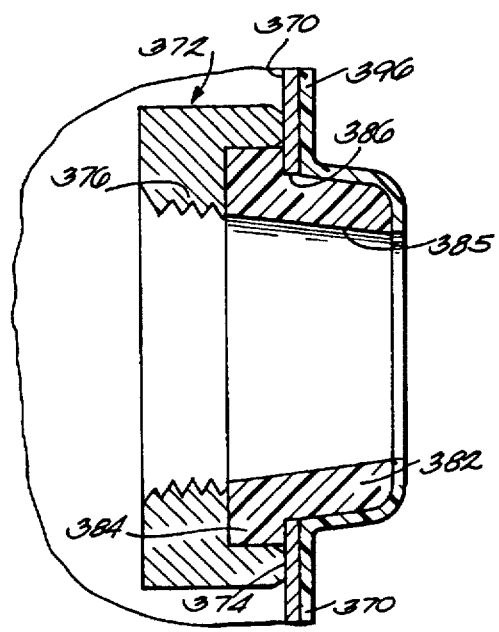
Figure 13D:
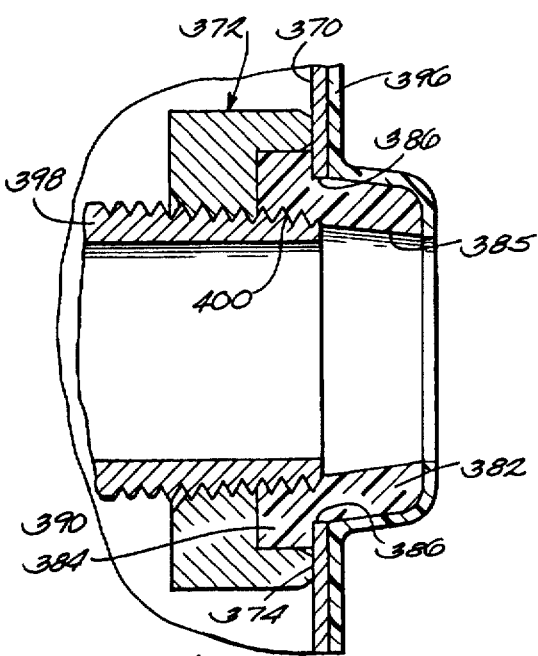
Figure 19:
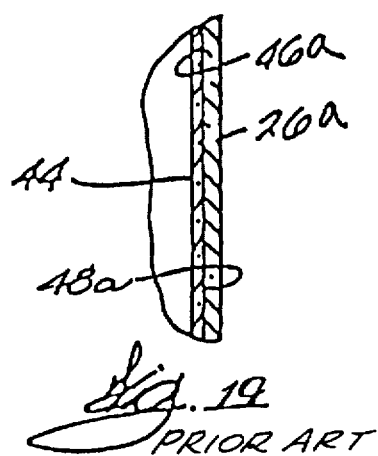
Figure 18:
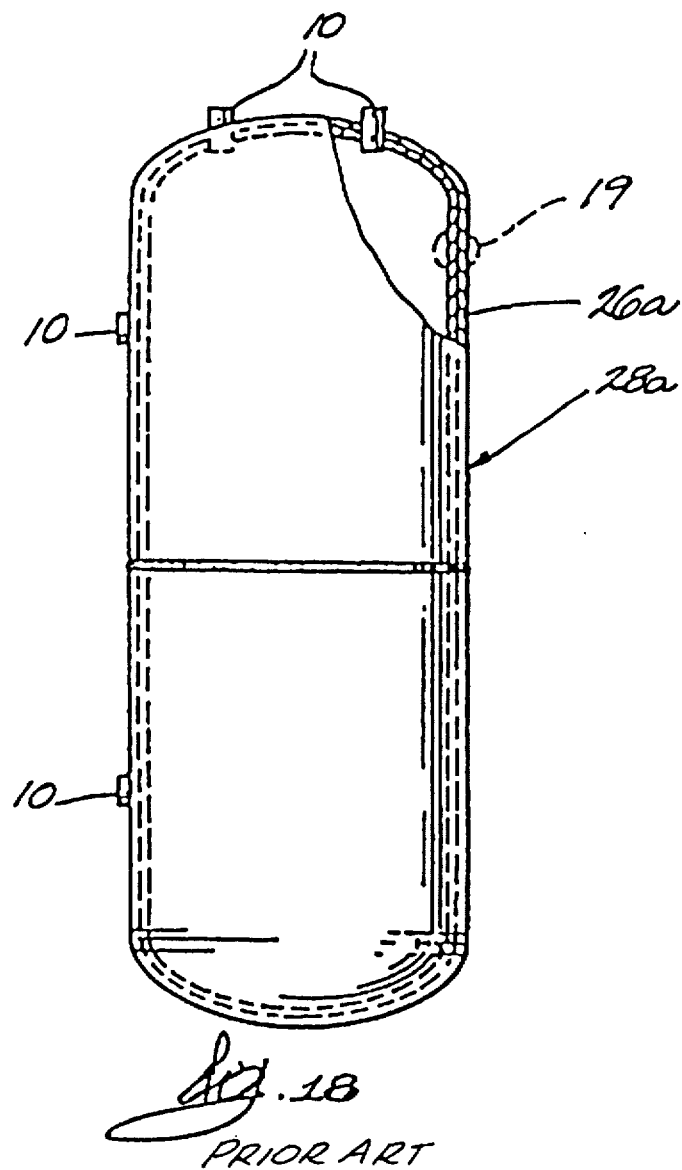

FIG. 13D shows the assembly of FIG. 13C with a threaded pipe nipple 398 installed in fitting 372. In a water heater tank, the threaded nipple 398 may be a part of a temperature and pressure relief valve or a part of a drain valve. It will be appreciated that as a threaded pipe nipple 398 is threaded into fitting 372, the lead threads 400 thereon will cut into the polymer material of tapered surface 385 of sleeve 380 to thereby cut a length of threads into surface 385 as shown in FIG. 13D.

The present invention constitutes an improvement to the tank connection shown in FIGS. 13A–13D.

As explained hereinafter, an object of the present invention is to eliminate or at least reduce the likelihood of water leakage into contact with metal parts of the connector and/or the metal outer tank shell.

One embodiment of the present invention is described as follows. The description will be made in the form of an explanation of the method of fabrication of the tank connector and the tank in which the connector is mounted.

Referring to the drawings in detail, FIGS. 1, 2, 3 and 3a show one embodiment of a tank connector assembly identified by reference numeral 10.

The first step in the assembly of connector 10 is to assemble bonding member 12 (FIGS. 8 and 9) with insert member 14 (FIGS. 6 and 7). Member 12 is preferably of polymer material and has an inverted cup-shape comprised of a top ring portion 16 and a depending cylindrical wall portion 18. Member 14 is also preferably of a polymer material and has a cylindrical shape comprised of an upper section 20 and a lower section 22 of a smaller diameter than the upper section 20. A shoulder 21 is formed between sections 20 and 22.

Parts 12 and 14 can be assembled to form a sub-assembly by simply forcing cup-shaped member 12 over the top section 20 of member 14.

An alternate method would be a co-injection molding process wherein bonding member 12 would be molded and inserted into a suitable mold and then insert member 14 would be injection molded into the bonding member 12 to produce a single part. A second alternative co-injection molding process could be employed wherein insert member 14 would be molded and inserted into a suitable mold and then bonding member 12 would be injection molded onto the insert member 14 to produce a single part.

The co-injection molding processes described above could be performed by an automated molding apparatus.

The next step in the assembly of connector 10 is to assemble the sub-assembly of parts 12 and 14 into a spud member 24. Spud member 24 (FIGS. 4 and 5) is made of metal (preferably steel) and is comprised of an internally threaded upper portion 26 and a cylindrical depending wall portion 28 having a weld projection 30 formed at the end of wall 28. The sub-assembly of parts 12 and 14 is forced upwardly into the space inside the spud member defined by depending wall portion 28.

Figure 11:
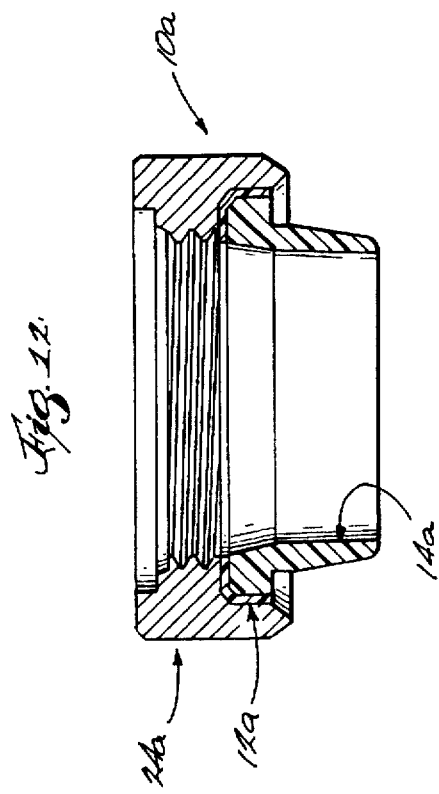
FIG. 11 is a top plan view of the core member shown in FIG. 10.

The final step in the assembly of connector 10 is to install a plug member 32 into the spud 24. Plug member 32 (FIGS. 10 and 11) is preferably of a polymer material such as 15% glass filled fluoroplastics and is comprised of an externally threaded top portion 34 and a closed nose portion 36. Plug member 32 is threaded into spud member 24 to complete the connector assembly 10 as shown in FIG. 1. The upper interior 38 of plug member 32 is splined to facilitate its installation into and removal from spud member 24 by a suitable tool (not shown).

The particular polymer materials used in making bonding member 12 and insert member 14 and the characteristics of such materials are important features of the present invention and will be described in detail hereinafter.

The next step in the fabrication of a finished tank connector is to securely fasten the assembly 10 in the steel wall 11 of a tank. This is accomplished by positioning the assembly 10 in an opening 13 in the wall 11 of a tank and then welding the projection 30 on spud wall 28 to the surface of the tank wall as shown in FIG. 2. The welding step will cause welding projection ring 30 to be fused to tank wall 11 as indicated by reference numeral 13 in FIG. 2. With the spud 24 welded in place, the shoulder 21 on insert member 14 will fit snugly against the outer surface of tank wall 11.

After the required number of assemblies have been welded to the tank wall, the fabrication of the completed tank is accomplished as follows.

To summarize, as shown in FIGS. 2, 3, 4, 5 and 6 of U.S. Pat. No. 5,217,140 (corresponding to FIGS. 15, 16, 17, 18 and 19 herein), the outer shell 26a of the completed tank 28a is comprised of two parts; namely, an upper half member 30a and a lower half member 32a, each of which is formed by a deep drawing process.

After the required number of connector assemblies 10 are welded to the tank half members, the half members are fastened together in a secure manner to form a completed outer shell.

Preferably such fastening step is performed by laser welding.

After the completed outer shell is fabricated, an inner shell 44 of non-corrosive polymer material is formed inside the outer shell adjacent the internal surface of the outer shell. In one preferred embodiment, the non-corrosive polymer material is polybutelene. The polybutelene material is introduced into the outer shell in powder form. This can be accomplished before the two halves are welded together or the powder material can be introduced through an opening in the tank wall after the two halves are welded together.

After the outer shell is charged with a polymer material, it is then subjected to rotational casting operation while heat is applied to the outer shell. A suitable rotational casting operation is described in detail in U.S. Pat. No. 5,217,140. Such a rotational casting operation will cause the powder material to melt and be distributed uniformly over the internal surface of the outer shell to thereby form an inner shell 44.

Referring to FIG. 3 of the present invention, the material of the inner shell will cover the tank wall and each connector fitting as shown in FIG. 3. The portion of the inner shell 44 which comes in contact with portion 22 of insert member 14 will be bonded to such member. The polymer material of inner shell 44 will puddle up in the area of the bond as indicated by reference numeral 45 in FIG. 3.

After the formation of the inner shell 44, the plug members 32 will be removed by a suitable tool to produce a finished connector assembly as shown in FIG. 3a.

As indicated above, members 12 and 14 are made of a polymer material. The particular characteristics of the materials of these two members is important.

Referring first to the material of insert 14, it is important that the tensile strength of the material be sufficiently great to prevent rupture at certain critical areas. A critical area is indicated by the dotted circle 23 on FIG. 2. The polymer material of member 14 must also be capable of providing a strong bond between the lower section 22 of member 14 and inner shell 44 in the area indicated by reference numeral 45 in FIG. 3.

Polymer materials suitable for use in making insert member 14 may be from the olefin family. More specifically, such materials can be polypropylene, polyethylene and polybutylene.

Referring now to the polymer material of bonding member 12, it is important that the material of member 12 is capable of bonding to both insert member 14 and the steel spud 24. In one preferred embodiment, material of member 12 is an olefin that has been maleated. For best results, the maleated olefin material has a resin component having a high melt index, i.e., an index of 4 or greater.

The maleated olefin bonding member will bond to spud member 24 over its external surface and will bond to insert member 14 over its internal surface. Such bonding will occur in the presence of heat. In a preferred embodiment, the bonding will occur during the rotational casting operation as described above wherein the inner tank shell 44 of polymer material is formed inside the outer shell. Such bonding of member 12 to both insert member 14 and spud member 24 will prevent, or at least substantially reduce any tendency of the water in the tank to leak past the outer surface of insert member 14 which, in turn, prevents water from coming in contact with the wall 11 of the steel tank. Such contact, if allowed to occur, could cause corrosion of the steel tank. The bond between the outer surface of wall 18 of bonding member 12 and spud 24 prevents water from coming in contact with wall 28 of spud 24 to thus prevent corrosion of the spud.

It will be appreciated that because of the sandwich position of member 12 in the assembly 10, the tensile strength of bonding member 12 need not be as great as that of insert member 14. The important characteristic of bonding member 12 is its capability of becoming bonded to both insert member 14 and spud 24 as explained above. The fact that in obtaining the desired bonding characteristic there is some loss of tensile strength does not pose a problem.

On the other hand, as indicated above, it is important that insert member 14 have a sufficient tensile strength to prevent a possible rupture in the area indicated by the dotted circle 21 in FIG. 2. By maintaining sufficient tensile strength in insert member 14, its capability of bonding to spud 24 is reduced. This again does not pose a problem because of the bonding function of bonding member 12 as explained above.

The particular configuration of the connector assembly 10 described above is for connection of hot and cold water connections to the tank and for installation of a drain valve and a temperature/pressure valve to a water heater tank.

The configuration of the connector assembly 10a shown in FIG. 12 is designed for mounting an electrical heating element to the tank of an electric water heater. The parts of FIG. 12 corresponding to the parts of FIG. 1 are designated with an identical number with a suffix "a".

While the invention has been herein shown and described in what is presently conceived to be the most practical and preferred embodiment, it will be obvious to one or ordinary skill in the art that modifications may be made thereof within the scope of the invention, which scope is not to be limited except by the appended claims.

We claim:

1. A tank connector assembly comprising:
   a metal spud member (24) having an upper internally threaded cylindrical portion (26) and a lower cylindrical wall portion (28) having an internal smooth wall surface portion;
   an insert member (14) of polymer material having a cylindrical wall portion, said wall portion having an internal and an external face, said insert member mounted inside said cylindrical wall portion of said spud member and spaced therefrom, said insert member (14) having an upper cylindrical section (20) and a lower cylindrical section (22) of a smaller diameter than said upper section to thereby form a shoulder (21) between said upper and lower cylindrical sections; and
   a bonding member (12) of polymer material having a cylindrical wall portion (18) having internal and external cylindrical wall surfaces, said cylindrical wall portion of said bonding member positioned in the space between the external surface of said cylindrical wall portion of said insert member and the internal surface of said cylindrical wall portion of said spud member, said internal and external wall surfaces of said cylindrical wall portion of said bonding member bonded to said external wall surface of said insert member and to said internal smooth wall surface of said spud member.

2. A tank and tank connector therefor comprising:
   an outer steel tank having at least one opening therein;
   an inner steel tank of polymer material mounted inside said outer steel tank;
   a tank connector assembly to facilitate a connection between the interior of said inner tank and the exterior of said outer tank, said tank connection assembly comprising:
   a metal spud member (24) having an upper internally threaded portion (26) and a lower cylindrical wall portion (28), said cylindrical wall portion welded to the steel outer tank at the opening therein;
   an insert member (14) of polymer material having a cylindrical wall portion, said insert member mounted inside said cylindrical wall portion of said spud member, said polymer material of said inner shell being bonded to said insert member, said insert member (14) having an upper cylindrical section (20) and a lower cylindrical section (22) of a smaller diameter than said upper section to thereby form a shoulder (21) between said upper and lower cylindrical sections, said shoulder being in snug engagement with said outer steel tank;
   a bonding member (12) of polymer material having a cylindrical wall portion (18 having internal and external cylindrical wall surfaces, said cylindrical wall portion of said bonding member positioned between the external surface of said cylindrical wall portion of said insert member and the internal surface of said cylindrical wall portion of said spud member, said internal and external wall surfaces of said cylindrical wall portion of said bonding member bonded to said insert member and to said lower cylindrical wall portion (28) of said spud member, respectively.

* * * * *